(12) United States Patent
Maddahi et al.

(10) Patent No.: US 11,403,963 B2
(45) Date of Patent: Aug. 2, 2022

(54) AUTOMATED DENTAL ARTICULATOR AND METHOD FOR TRAINING AND PRACTICING DENTAL PROCEDURES

(71) Applicant: Tactile Robotics Ltd., Winnipeg (CA)

(72) Inventors: Yaser Maddahi, Winnipeg (CA); Maryam Kalvandi, Winnipeg (CA); Ali Maddahi, Winnipeg (CA); Alireza Akhoondi Asadi, Winnipeg (CA)

(73) Assignee: Tactile Robotics Ltd., Winnipeg (CA)

( * ) Notice: Subject to any disclaimer, the term of this patent is extended or adjusted under 35 U.S.C. 154(b) by 114 days.

(21) Appl. No.: 17/115,166

(22) Filed: Dec. 8, 2020

(65) Prior Publication Data

US 2021/0174705 A1 Jun. 10, 2021

Related U.S. Application Data

(60) Provisional application No. 62/945,940, filed on Dec. 10, 2019.

(51) Int. Cl.
*G09B 23/32* (2006.01)
*G09B 23/28* (2006.01)
*G09B 5/06* (2006.01)

(52) U.S. Cl.
CPC .......... *G09B 23/283* (2013.01); *G09B 5/065* (2013.01); *G09B 23/32* (2013.01)

(58) Field of Classification Search
CPC ....... G09B 23/283; G09B 5/065; G09B 23/32
See application file for complete search history.

(56) References Cited

U.S. PATENT DOCUMENTS 11,213,373 B1 * 1/2022 Raslambekov ...... A61C 11/025

* cited by examiner

*Primary Examiner* — Robert P Bullington
(74) *Attorney, Agent, or Firm* — Ryan W. Dupuis; Kyle R. Satterthwaite; Ade & Company Inc.

(57) ABSTRACT

An automated dental articulator training system has one or more apprentice's workstations that use data acquired from an instructor's workstation. The instructor's workstation has a dental articulator including teeth, gingiva, a palate, and mechanism; a video streaming system; a set of actuators to drive the mechanism; a set of sensory systems to sense angular or linear velocity or displacement of the mechanism; a data storage unit; and a software showing statistical and graphical information of the system while a dental procedure is performed by an instructor or an apprentice. The apprentice's workstation articulator excludes the video streaming system, but is otherwise identical. The dental articulator training system includes a processing unit to operate the actuation system according to the values set by the instructor or each apprentice. Alternatively, the training system provides the apprentices with audiovisual feedback from the instructor's workstation along with the data of the actuators at the instructor's workstation.

20 Claims, 7 Drawing Sheets

A   B
C   D

AUTOMATED DENTAL ARTICULATOR AND METHOD FOR TRAINING AND PRACTICING DENTAL PROCEDURES

This application claims the benefit under 35 U.S.C. 119(e) of U.S. provisional application Ser. No. 62/945,940, filed Dec. 10, 2019.

FIELD OF THE INVENTION

The present invention relates to a sensorized and motorized dental articulator used to mount typodont that is a model of the oral cavity including teeth, gingiva, and a palate, to teach and practice dental procedures. More particularly, the present invention relates to a training system and method of use of the training system such that (i) an instructor at an instructor's workstation sets the configuration (position and orientation) of a motor-driven dental articulator at a desired configuration and the motor-driven dental articulator at each student's workstation is automatically positioned in that desired configuration. This allows each student at the students' workstations to understand and visualize the actual posture of the oral cavity during the performance of a dental task, (ii) the motor-driven dental articulator at each student's workstation is automatically set to the posture defined by the instructor prior to teaching a dental procedure (teaching mode), (iii) the motor-driven dental articulator at each student's workstation is set to the configuration that has been set by the instructor in the teaching session before the student begins practicing a dental procedure; (iii) the motor-driven dental articulator at each student's workstation can be set to a desired configuration by each student to practice a dental procedure; and/or (iv) a software connects the motor-driven dental articulator at the instructor's workstation to the motor-driven dental articulator at each student's workstation to provide measurable feedback from both workstations and captures multiple videos from the instructor's workstation and send to the students' workstations in a real-time fashion.

The students are able to experience learning and practicing on the motor-driven dental articulator that reflects the actual configuration of a patient's mouth, and are able to understand, learn, and practice techniques of the dental procedures conducted by their instructor in a classroom, dental laboratory, dental clinic, or at a remote location.

BACKGROUND

The pre-clinical dental curriculum, even when taught in an integrated manner, often does not prepare the students to competently provide treatment, nor does it aid with their transition to the patient care clinic. One of the fundamental challenges that needs to be addressed is the difference in the method of teaching in dentistry (tabletop technique) and the way that the students are asked to practice the lecture that they are taught (working on mannequins). This requires the students to transfer the orientation at which the instructor has taught (tabletop) to the orientation that they actually need to able to work (patient or mannequin). Existing platforms do not provide the opportunity of working on the typodont at a posture similar to the patients in the clinic, i.e., supine position.
Traditional Tools In dentistry, the use of classroom and hands-on training by experts has been a training mechanism of choice for most training programs. This training mechanism is also called the traditional novice-expert apprenticeship model as described in K. Kunkler, "The role of medical simulation: an overview", Int. J. of Medical Robotics and Computer Assisted Surgery, vol. 2, pp. 203-210, 2006. In this traditional model, dental and dental hygiene students (hereafter called apprentices) acquire technical dental skills through years of hands-on training in dental laboratories, pre-clinic laboratories, and clinics, and receive supervision and feedback from their mentors (hereafter called instructors) relative to dental performance skills. Specifically, instructors conduct a procedure that offers the apprentices the opportunity of observing, then assisting, and finally performing that procedure under the supervision of their instructor. That is how apprentices acquire years of hands-on training and deliberate practice in mastering the required skills.

In the field of dentistry, the actions performed while teaching and practicing in the traditional novice-expert apprenticeship model are normally different, as the teaching process is normally done by the instructor on a tabletop form while the lower jaw is located on a table in an orientation parallel to the ground, and the instructor uses a top camera to show the students how to conduct a dental task by means of the monitors installed on each apprentice's workstation. The same procedure is followed for the upper jaw, i.e., the instructor puts the upper jaw on the table and conducts a dental operation that is not realistic and does not allow the apprentices to sensibly understand how to handle a dental tool and how to approach the oral cavity to successfully complete a dental procedure. Additionally, due to the difference between the positions of the teaching (tabletop) and practicing (working on a mannequin) methods, the apprentices need to transfer the posture of the tool and dental handpiece taught by the instructor (tabletop) to the real situation in which the mannequin (simulating the patient) is in a supine position and the jaws are almost 90 degrees different compared to the tabletop. Therefore, having a mechanism that allows the instructor to teach dental operations in a manner close to the actual posture of the patient in practice would help the apprentices have a better understanding of the dental operation and implement the knowledge taught in the classroom more efficiently and quickly.

There are several types of typodont that are used in dental colleges, including Easyinsmile Dental Caries Tooth Study, Angelwill Dental Teaching Study Model Adult Standard Typodont, Doc.Royal Dental Teach Study, YOUYA Professional Kids Permanent Teeth, Yosoo Transparent Adult Pathologies Dental Dentist Implant Demonstration, Pwhite Dental Periodontal Diseases Assort Teeth Typodont Study, ROSENICE Teeth Model Dental Model Standard Dental Teaching Study Typodont Demonstration Tool, and Frasaco. Although they are all functional tools with which to practice dentistry, none of them allows the students to place the typodont at an orientation that is close to real patients without having a bulky and non-portable mannequin as a dental simulator.

An articulating apparatus, a bite registration guide, and a procedure for diagnosis and study, used for the mounting preparation and arrangement of the stereodont orthodontic study model are disclosed in Acevedo R, inventor. Dental articulator for determining x, y, and z displacement of separate teeth. U.S. Pat. No. 4,083,114. 1978 Apr. 11. The procedure comprises sequential stages including Stage A: The coronal assemblies of the Orthodontic Study Model are provided with the stone models of the crowns of the upper and lower teeth of the patient; Stage B: The completed coronal assemblies of Stage A are coupled to any new bite registration guide in the Orthodontic Study Model to form a triad of upper and lower models with the bite registration guide; and, Stage C: The triad obtained in Stage B, consisting of coronal assemblies coupled to a bite registration and mounted on the Orthodontic Study Model.

Dental articulator systems and dental articulators are disclosed in Sampson A H, inventor. Dental articulator system and apparatus. U.S. Pat. No. 10,350,038. 2019 Jul. 16. The disclosed dental articulator systems comprise a bite registration, a dental articulator, and a mounting jig. The bite registration comprises a buccal rail configured to be positioned along the exterior perimeter of a patient's dentition; at least one vestibular component supported by and slidable along the buccal rail for identifying a reference position, and at least one bite registration module supported by and slidable along the buccal rail, and forming an aperture through which bite registration material may be injected into the patient's dentition. The dental articulator comprises an upper articulator member for mounting a maxillary dentition model and a lower articulator member for mounting a mandibular dentition model. The mounting jig is configured to receive the bite registration and to indicate the proper alignment of the position of the maxillary dentition model and the mandibular dentition model with respect to one another.

Dental Simulators

Currently, dental schools use mannequins simulating different postures of patients. These simulated models allow the students to improve on their hand-eye coordination and dexterity; however, the instructors are normally teaching on a tabletop model (that does not emulate the real posture of a patient) and the apprentices are then asked to practice on mannequins. This creates discomfort for apprentices and makes them calculate transformation equations in their mind to convert the posture of the tabletop typodont to the angled one in the mannequin's mouth. Note that the dental simulators are normally providing the students and the instructor with the opportunity of adjusting the jaw in a virtual environment (software).

There exist some studies on the performance of available dental simulators that use the mechanical properties of teeth to simulate the oral cavity on which dental tasks are conducted. Some examples are Marras I, Nikolaidis N, Mikrogeorgis G, Lyroudia K, Pitas I. A virtual system for cavity preparation in endodontics. Journal of Dental Education, 2008 Apr. 1; 72(4):494-502 & Bakr M M, Massey W, Alexander H. Evaluation of Simodont® Haptic 3D virtual reality dental training simulator. International Journal of Dental Clinics. 2013 Dec. 30; 5(4) & Iacopino A M. The influence of "new science" on dental education: current concepts, trends, and models for the future. Journal of Dental Education. 2007 Apr. 1; 71(4):450-62.

Research has assessed the perception of academic staff members on the realism of the Simodont® haptic 3D-VR (virtual reality) dental trainer that includes a virtual dental articulator as disclosed in Bakr M. M., Massey W. L., and Alexander H., "Evaluation of SIMODONT® haptic 3D virtual reality dental training simulator", Int. J. of Dental Clinics, vol. 5, no. 4, 6 pages, 2013. This simulator was manufactured by MOOG Industrial Group, Amsterdam. This simulator comprises a simulator unit, a panel, a stereo projection, a spacemouse, a handpiece, and a projector. The Simodont® courseware has been developed by the Academic Centre for Dentistry in Amsterdam. The courseware allows a variety of operative dental procedures to be practiced in a virtual oral and dental environment with force feedback. While the Simodont® helps the students have a visual understanding of the posture of the tooth in a virtual environment, it does not allow the students to physically feel the oral cavity and experience real tool handling in an appropriate manner.

A haptic-based dental simulator was also developed and preliminary user evaluations on its first-generation prototype have been carried out as disclosed in Wang D., Zhang Y., Hou J., Wang Y., Lv P., Chen Y., and Zhao H., "iDental: a haptic-based dental simulator and its preliminary user evaluation", IEEE Trans. On Haptics, vol. 5, no. 4, pp. 332-343, October-December 2013. Based on the detailed requirement analysis of periodontics procedures, a combined evaluation method including qualitative and quantitative analysis was designed.

Most of the dental simulators use the concept of virtual reality (VR). In the 1990s, the concept of a VR dental training system was introduced to practice cavity preparation as disclosed in Ranta J. F. and Aviles W. A., "The virtual reality dental training system-simulating dental procedures for the purpose of training dental students using haptics," Proc. Fourth PHANTOM Users Group Workshop, November 1999. A training system was developed, enabling the operator to practice the detection of carious lesions as described in Thomas G A., Johnson L., Dow S., and Stanford C., "The design and testing of a force feedback dental simulator," Computer Methods and Programs in Biomedicine, vol. 64, pp. 53-64, 2000. PerioSim© was developed for periodontal simulation, which can simulate three typical operations including pocket probing, calculus detection, and calculus removal as described in Luciano C., Banerjee P., and DeFanti T., "Haptics-based virtual reality periodontal training simulator," Virtual Reality, vol. 13, no. 2, pp. 69-85, 2009. Two generations of prototypes were developed by hapTEL based on feedback from user evaluation as described in Tse B., Harwin W., Barrow A., Quinn B., San Diego J., and Cox M., "Design and development of a haptic dental training system-hapTEL," EuroHaptics '10: Proc. Int'l Conf. Haptics Generating and Perceiving Tangible Sensations, 2010. Forsslund Dental system was developed to practice dental drilling and wisdom tooth extraction as described in Forsslund J., Sallnas E. L., and Palmerius K. J., "A user-centered designed foss implementation of bone surgery simulations," Proc. World Haptics Conf., pp. 391-392, 2009. A haptics-based VR periodontal training simulator was developed to demonstrate the scientific contribution and usefulness of the simulator as a vital part of the periodontics curriculum as described in Steinberg A. D., Bashhok P. G., Drummond J., Ashrafi S., and Zefran M., "Assessment of faculty perception of content validity of PerioSim©, a haptic-3D virtual reality dental training simulator", J. of Dental Education, vol. 71, no. 12, pp. 1574-1582, 2007. A haptic VR crown preparation simulator was presented in Rhienmora P., Haddawy P., Suebnukarn S., and Dailey M. N., "Intelligent dental training simulator with objective skill assessment and feedback," Artificial Intelligence in Medicine, vol. 52, pp. 115-121, 2011 which includes a VR environment with haptic feedback for dental students to practice dental surgical skills, in the context of a crown preparation procedure. The simulator addressed challenges in traditional training such as the subjective nature of surgical skill assessment and the limited availability of expert supervision. A PHANToM Omni haptic device was used that allowed for six degrees of freedom (DOFs) for position sensing and generated three DOFs for the force feedback. The virtual dental handpiece was locked to the position and orientation of the haptic stylus as described in SensAbleTechnologies, OpenHaptics toolkit, http://www.sensable.com/products-openhaptics-toolkit.htm;

2005, accessed in 2018. Simulator software was also developed using Open-Haptics SDK 2.0 (Haptic Device API) and optimized collision detection as referenced in Terdiman P. Memory-optimized bounding-volume hierarchies, http://www.codercorner.com/Opcode.pdf; 2001, accessed in 2018.

A VR dental training system was presented to address limitations in previous systems and to introduce new techniques in which (i) tooth data are presented as a 3D multi-resolution surface model, reconstructed from a patient's volumetric data to improve real-time rendering performance (when compared to a direct volume rendering technique); (ii) collision detection and collision response algorithms were applied that could handle a non-spherical tool such as a cylindrical one; and (iii) the system simulated tooth surface exploration and cutting with a cylindrical burr by utilizing a surface displacement technique as referenced in Rhienmora, P., Haddawy, P., Dailey, M.N., Khanal, P. and Suebnukarn, S., "Development of a dental skills training simulator using virtual reality and haptic device", NECTEC Technical Journal, vol. 8, no. 20, pp. 140-147, 2008. A system using a commercial haptic device was used to replicate a realistic experience for dental and dental hygiene students and clinicians as well as to train periodontal procedures according to Eid, M., Loomer, P., Sefo, D., Korres, G. and Karafotias, G., New York University, 2016. Haptic-based dental simulation. U.S. Patent Application 2017/0352292 A1. The system has three features: (i) a custom grip to attach dental instruments to the haptic device, which enhances the grip experience since learners feel the tactile properties of the instruments; (ii) two haptic devices are utilized to simulate haptic feedback with both the dental instrument (dominant hand) and the mirror instrument (non-dominant hand); and (iii) a finger support mechanism using parallel manipulation is used for the intraoral fulcrum during probing. The system includes software and hardware subsystems. The software subsystem comprises two graphical user interfaces (GUIs) in which an instructor defines periodontal exercises for learners to practice and a simulation window where periodontal exercises are displayed for learners to interact with.

Augmented reality (AR) haptic systems have also been used for dental surgical skills training. A dental training simulator utilizing a haptic device was developed based on AR and VR technologies as described in Rhienmora P., Gajananan K., Haddawy P., Dailey M. N., and Suebnukarn S., "Augmented reality haptics system for dental surgical skills training, ACM Symposium on Virtual Reality Software and Technology, pp. 97-98, Nov. 22-24, 2010, Hong Kong. The simulator utilizes volumetric force feedback computation and real-time modification of the volumetric data to allow students practicing dentistry in proper postures by combining three-dimensional models of the tooth and the tool with the real-world view (by means of the monocular camera) and displaying the result through a video see-through head-mounted display. This dental simulator consists of a graphical display and a haptic device for simulation of virtual dental tools. The system allows dentists to practice using a probe to examine the surface of a tooth, to feel its hardness, and to drill or cut the tooth.

The Iowa dental surgical simulator unit focuses on tactile skill development as described in Johnson L., Thomas G., Dow S., and Stanford C., "An initial evaluation of the Iowa dental surgical simulator", J. of Dental Education, vol. 64, no. 12, pp. 847-853, 2000. The system consists of three hardware components: a computer, a monitor, and a force feedback device with software. Participants interact with the computer by grasping a joystick or explorer handle attached to the force feedback device. Teeth are displayed on the monitor, and the student can manipulate the joystick or explorer in such a way as to "feel" enamel, healthy dentin, and carious dentin. Different haptic responses are received when the joystick or explorer is manipulated over the appropriate areas of the tooth.

A dental simulator was developed to provide haptic feedback when the dental tool being held by the user. The simulator's goal is to provide a learning experience resembling reality as described in Gal G. B., Weiss E. I., Gafni N. and Ziv A., "Preliminary assessment of faculty and student perception of a haptic virtual reality simulator for training dental manual dexterity", J. of Dental Education, vol. 75, no. 4, pp. 496-504, 2011. The system offers a stylus, with six degrees of freedom, attached to a stand that provides the holder with feedback based on a 3D image viewed on the screen.

Another dental simulation system was developed to improve dental students' transition from the preclinical laboratory to the clinic as described in Jasinevicius, T. R., Landers, M., Nelson, S. and Urbankova, A., "An evaluation of two dental simulation systems: virtual reality versus contemporary non-computer-assisted", J. of Dental Education, vol. 68, no. 11, pp. 1151-1162, 2004. The aim was to compare the efficacy of a VR computer-assisted simulation system with a contemporary non-computer-assisted simulation system. The objectives were to determine whether there were differences between the two systems in the quality of the students' preparations and the amount of faculty instruction time.

A system and method for creating a model of a patient's mandible and any teeth supported from the mandible and manipulating the mandible relative to anatomical features of the patient's maxilla was disclosed in Richter D D, inventor. Virtual dental articulator and system. U.S. Pat. No. 10,052, 180. 2018 Aug. 21. The system uses markers positioned on the mandible and on the maxilla to create a functional mandibular axis that approximates an axis through the condyles of the patient. The functional mandibular axis and geometric and anatomical information about the patient's upper and lower jaws are then used to create prostheses for the patient. The system is also used for making corrections to the prosthesis.

A system and method taught to design a change to a virtual dental model comprising a virtual articulator, representing a three-dimensional model of a patient's upper and lower dental arches, was disclosed in Perot J M, Embert H, Marcil F, inventors; Cynovad Inc, assignee. System and method for virtual articulator. U.S. patent application Ser. No. 10/734,263. 2004 Sep. 2. The model includes data defining a constraint of motion between the upper and lower dental arches; a simulation analyzer to simulate the motion using a three-dimensional model and analyze resulting contacts on portions of the upper and lower arches during the movement to provide contact data; and a designing module to design a virtual prosthesis for one of said upper and lower arches and a virtual desired dental modification using the contact data acquired from the simulation analyzer and the virtual articulator. Improved methods and apparatus for recording and stimulating the condylar movement of an individual are disclosed in Presswood R G, Presswood Jr R G, inventors; Jr., assignee. Method and apparatus for dental articulation. U.S. Pat. No. 10,380,271. 2019 Aug. 13. This invention also provides a computerized dental articulator method that is designed to simulate the jaw or condylar movements of a patient. This instrument enables a dentist to obtain the necessary diagnostic information for the treatment of the occlusal irregularities, such as malocclusion, and the fabrication of dental restorations or "dentures" and for the development of an orthodontic treatment plan.

Currently, teaching students how to conduct dental operations in operative dentistry is largely taught and learned through the traditional model, in which the instructor places the lower or upper jaw on the table (tabletop) and conducts dental tasks. The students can acquire technical dental skills by means of monitors showing a video of the instructor's work, provided by a top camera at the instructor's side. When it comes to practice, the students have to work on mannequins that are designed to be used as a patient in the pre-clinic. There is a difference in conducting the task in the teaching method (tabletop) and the way the students are asked to practice (working on mannequins). Therefore, trial and error often constitutes a major part of the students' learning of psychomotor skills. In other words, the students have to solve some transformation equations in their mind to convert the posture and tool handling taught by the instructor to the posture and tool handling required to use in working with mannequins or patients. If the teaching approach becomes closer to the practice approach, with decreasing operating hours and training resources available, there is an increasing demand to improve training efficiency and provide a realistic configuration of the oral cavity during teaching.

SUMMARY OF THE INVENTION

According to one aspect of the present invention there is provided a dental training apparatus for supporting a dental model having a lower jaw portion supporting lower teeth thereon and an upper jaw portion supporting upper teeth thereon, the apparatus comprising:

a dental articulator comprising (i) a lower frame member arranged to support the lower jaw portion of the dental model thereon, (ii) an upper frame member arranged to support the upper jaw portion of the dental model thereon, and (iii) a first hinge assembly coupling the lower frame member to the upper frame member so as to be pivotal relative to one another about a jaw axis of the first hinge assembly;

a supporting assembly supporting the dental articulator thereon comprising (i) a supporting frame member, and (ii) a second hinge assembly coupling the supporting frame member to a primary frame member among the lower frame member and the upper frame member such that said primary frame member is pivotal relative to the supporting frame member about a tilt axis of the second hinge assembly;

at least one of the hinge assemblies comprising a controlled hinge assembly including an actuator operatively connected between the frame members of the controlled hinge assembly; and a controller operatively connected to the actuator of the controlled hinge assembly so as to be arranged to controllably pivot the frame members relative to one another such that the frame members of the controlled hinge assembly assume a prescribed angular orientation of the controlled hinge assembly relative to one another.

The prescribed angular orientation may be acquired in several different manners including (i) being input into the controller by a trainee prior to practicing a dental procedure; (ii) being acquired from a measured angle from a similar apparatus positioned by an instructor in real time with the trainee practicing the dental procedure; or (iii) being acquired from a measured angle from a similar apparatus positioned by an instructor prior to the trainee initiating a dental procedure by storing the measured angle in memory for later recall.

The training system allows dental and dental hygiene apprentices to learn dental operations in a manner that is close to the patients' real posture in the clinic. More particularly, the invention provides an understanding of proper angulation (both position and orientation) of the oral cavity including upper jaw and lower jaw, through installing and embedding sensors and actuators into a mechanical linkage onto which a set of typodonts and a video streaming system may be mounted, and by means of an effective software that may connect an instructor's workstation and multiple apprentices' workstations.

In preferred embodiments, the invention (hereafter called training system) relates to a sensorized and actuated adjustable platform, comprising an automated dental articulator at the instructor's workstation and an automated dental articulator at the apprentice's workstation, that are connected through a data transmission system that could use a wireless or wired communication network. The training system at the instructor's workstation comprises a set of actuation systems used to drive the shafts at the articulator's joints and a set of sensory systems that measures the angular and/or linear displacements of each motor or joint and provides feedback for a control system. The two sets of physical models of upper and lower jaws and associated teeth are mounted onto the articulator, and the data of the training system, including videos from cameras and motors' displacements and velocities, are transferred to each apprentice's workstation through a data transmission system. There is a video streaming system at the instructor's workstation that captures real-time audiovisual feedback from multiple angles including an angle showing the instructor's views during the performance of a dental task. The training system also includes software through which the instructor is able to command the motors to be placed in the desired configuration (orientation and position) and transfers the data to the data transmission system to be forwarded to each apprentice's workstation. The software at the instructor's workstation sends signals to the motors such that the data set by the instructor are sent to the software and then forwarded to the setup at the apprentice's workstation, through the data transmission system, to automatically set the apprentices' articulators at the desired orientation determined by the instructor that is helpful when the instructor teaches in the class in a live mode and the apprentices watch the movies provided by the cameras at the instructor's workstation. The training system at the apprentice's workstation includes a similar setup as the instructor's workstation excluding the video streaming system. The training system at the apprentice's workstation also includes software that shows different angles of the cameras used at the instructor's workstation and is able to switch the views of the camera.

The invention is useful for pedagogical and professional purposes. The invention is used for training and educating dental apprentices and novice dentists in a classroom, clinical, laboratory setting or from a remote location. However, the application could be well extended to other fields of health sciences such as general surgery and neurosurgery where the exact placement of the physical model of human tissue or cadaveric tissue such as a skull is of importance for better hand-eye coordination. The invention also relates to the teaching method as well as its use for training purposes and emulating therapeutic strategies.

The invention provides the apprentice with the precise angulation (orientation and position) of the oral cavity including jaws by measuring the angles at the instructor's workstation when the angles are set to desired values, sending the values to the apprentice's workstation, and automatically setting the articulator at the apprentice's workstations at those defined values. The invention, therefore, helps the apprentice understands and perceives how the instructor is conducting the dental operation while the articulator is set on a configuration similar to the patient's mouth configuration in a dental clinic. The invention helps the apprentice synchronizes the audiovisual feedback received from the instructor's workstation with proper orientation of the oral cavity by means of the video streaming system that is located at different locations of the setup at the instructor's workstation to provide different angles of view from the dental zone and dental articulator. The invention is used for both teaching and practicing purposes. In the teaching mode, the invention provides the apprentices with the audiovisual feedback from the instructor's workstation while their articulator mimics the exact configuration of the oral cavity set by the instructor at the instructor workstation that is close to the patient's real posture while lying supine on the dental bench; therefore, this helps the apprentices learn how to conduct dental tasks and relate the tasks to the posture of the patient. In the practicing mode, the apprentices use the invention, while the instructor is not present, to set the oral cavity at a particular configuration and perform dental tasks to enhance their dental performance skills.

Preferably said at least one of the hinge assemblies includes the first hinge assembly such that the controller is arranged to actuate the actuator of the first hinge assembly to pivot the upper and lower frame members relative to another about the jaw axis to assume the prescribed angular orientation of the first hinge assembly.

Said at least one of the hinge assemblies may also include the second hinge assembly such that the controller is arranged to actuate the actuator of the second hinge assembly to pivot the primary frame member relative to the supporting frame member about the tilt axis to assume the prescribed angular orientation of the second hinge assembly.

When the dental training apparatus further comprises a base assembly comprising (i) a base frame member, and (ii) a third hinge assembly coupling the supporting frame member to the base frame member such that the supporting frame member is pivotal relative to the base frame member about an upright axis of the third hinge assembly, preferably said at least one of the hinge assemblies includes the third hinge assembly such that the controller is arranged to actuate the actuator of the third hinge assembly to pivot the supporting frame member relative to the base frame member about the upright axis to assume the prescribed angular orientation of the third hinge assembly.

Preferably the controlled hinge assembly further comprises a feedback sensor operatively connected to one or both frame members of the controlled hinge assembly so as to be arranged to provide a feedback signal relating to a position and/or a movement of the controlled hinge assembly to the controller, the controller being arranged to use the feedback signal from the feedback sensor in controlling the actuator to controllably pivot the frame members relative to one another such that the frame members of the controlled hinge assembly assume the prescribed angular orientation.

When the dental training apparatus includes an input device arranged to receive user input, the controller may be arranged to variably adjust the prescribed angular orientation stored thereon in response to the user input received by the input device. This corresponds to a first mode of operation in which the trainee may select the operating parameters of the training apparatus independently of an instructor apparatus.

Alternatively, the dental training may be provided in combination with an instructor apparatus for supporting an instructor model thereon in which the instructor model has a lower jaw portion supporting lower teeth thereon and an upper jaw portion supporting upper teeth thereon. Preferably the instructor apparatus comprises:

an instructor dental articulator comprising (i) a lower frame member arranged to support the lower jaw portion of the instructor model thereon, (ii) an upper frame member arranged to support the upper jaw portion of the instructor model thereon, and (iii) a first hinge assembly coupling the lower frame member to the upper frame member so as to be pivotal relative to one another about a jaw axis of the first hinge assembly;

an instructor supporting assembly supporting the instructor dental articulator thereon comprising (i) a supporting frame member, and (ii) a second hinge assembly coupling the supporting frame member to a primary frame member among the lower frame member and the upper frame member such that said primary frame member is pivotal relative to the supporting frame member about a tilt axis of the second hinge assembly; and a sensor assembly arranged to measure a measured angle between the frame members of at least one of the hinge assemblies of the instructor apparatus;

wherein the controller of the dental training apparatus is arranged to acquire the measured angle of said at least one of the hinge assemblies of the instructor apparatus from the sensor assembly and define the prescribed angular orientation of a corresponding one of the hinge assemblies of the dental training apparatus based upon the acquired measured angle from the instructor apparatus.

The controller of the dental training apparatus is arranged to acquire the measured angle and define the prescribed angular orientation of the dental training apparatus based upon the acquired measured angle from the instructor apparatus in real time. This corresponds to a second mode of operation in which the trainee performs a dental procedure on the training apparatus in real time while the instructor performs the same dental procedure on the instructor apparatus.

Preferably the apparatus further includes a memory arranged to store the measured angle from the instructor apparatus, in which the controller of the dental training apparatus is arranged to acquire the measured angle from the memory and define the prescribed angular orientation of the dental training apparatus based upon the acquired measured angle from the instructor apparatus subsequent to operation of the instructor apparatus. This corresponds to a third mode of operation in which the trainee performs a dental procedure on the training apparatus in at a later date subsequent to recording of the instructor performing the same dental procedure on the instructor apparatus.

One or more apprentice training apparatuses may be provided that are identical in configuration to said dental training apparatus. In this instance, each of the dental training apparatus and the one or more apprentice training apparatuses are arranged to acquire the measured angle of said at least one of the hinge assemblies of the instructor apparatus from the sensor assembly and define the prescribed angular orientation of a corresponding one of the hinge assemblies of the dental training apparatus based upon the acquired measured angle from the instructor apparatus, according to either of the second or third modes of operation.

The instructor apparatus may further include a video camera arranged to capture video images of the instructor dental articulator. In this instance, a video display is supported adjacent to the dental articulator of the dental training apparatus in which the video display is arranged to display the captured video images from the instructor apparatus.

Preferably a recording system is arranged to record the captured video images of the instructor dental articulator and record the measured angle from the instructor apparatus in association with the captured video images, and the controller of the dental training apparatus is arranged to subsequently acquire the measured angle and the captured video images from the recording system so as to be arranged to display the captured video images on the video display in synchronicity with operating the actuator of the controlled hinge assembly at the prescribed angular orientation based upon the acquired measured angle.

A plurality of video cameras may be arranged to capture video images from different fields of view of the instructor dental apparatus while the video display of the dental training apparatus is arranged to display the capture video images from each of the video cameras.

When providing an input device in communication with the controller so as to be arranged to receive user input, the controller of the training apparatus may be arranged to display captured video images only from one or more selected ones of the different fields of view in response to user input received from a user through the input device.

One of the video cameras may be supported internally within the instructor dental articulator so as to be arranged to capture video images of interior surfaces of the instructor model supported on the instructor dental articulator.

Furthermore, a field of view of the primary video camera may include a peripheral area surrounding the instructor dental articulator such that the video camera is arranged to capture the video images such that the video images include a hand and a dental tool within the hand of an operator performing a dental procedure on the instructor model.

According to another aspect of the present invention there is provided a method of use of the dental apparatus including:

while a trainee performs a dental procedure on the dental model of the dental training apparatus, using the controller to operate the actuator of the controlled hinge assembly of the dental training apparatus so as to be arranged to controllably pivot the frame members of the controlled hinge assembly relative to one another such that the frame members of the controlled hinge assembly assume said prescribed angular orientation of the controlled hinge assembly relative to one another.

According to another aspect of the present invention there is provided a method of use of the dental apparatus including:

measuring said measured angle on the instructor apparatus while an instructor performs a dental procedure on the instructor model supported on the instructor apparatus; and while a trainee performs said dental procedure on the dental model of the dental training apparatus, using the controller to operate the actuator of the controlled hinge assembly of the dental training apparatus so as to be arranged to controllably pivot the frame members of the controlled hinge assembly relative to one another such that the frame members of the controlled hinge assembly assume said measured angle as the prescribed angular orientation of the controlled hinge assembly relative to one another.

Although the invention is used for the field of dentistry, the application could be well extended to other fields such as general surgery and neurosurgery where the position and orientation of physical model, cadaveric, or actual human tissue is of importance during the performance of a task.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The invention augments conventional dental articulators with a set of sensory and actuation systems, video recording system, data transmission system, data storage, and a software to capture, analyze and visualize the data, to provide dental and dental hygiene students with a set of important information, including the position and orientation of the dental articulator when the instructor is conducting a dental task as well as to provide different angles of view captured by the cameras to allow the student visually learn and practice the techniques of handling instruments and tools in an examination, restorative, periodontal, prosthodontic, extraction/surgical, orthodontic, endodontic. While the articulator at the instructor's workstation is instrumented by sensory systems, a set of actuators and an audiovisual recording system, a data processing unit receives and analyzes the values of angular or linear displacement and velocity in each actuator. A data transmission system then transfers the information to each apprentice's workstation in the classroom or preclinical laboratory. Each apprentice has a custom-designed articulator similar to the one at the instructor's workstation, excluding the audiovisual recording system. The custom-designed articulator at the instructor workstation is instrumented by the second set of sensory systems and is actuated by a set of actuation systems to provide different rotations in a planar or spatial coordinate system. In each apprentice's workstation, the values of each actuator orientation measured in both instructor and apprentice's workstations are compared and analyzed to provide feedback to the controller in the data processing unit. A display shows the actual video of the instructor's tool taken by multiple cameras and streamed by a video streaming system to provide the apprentices with the opportunity of learning dental tasks in proper postures similar to the posture they will experience in the clinic while working on a patient. In summary, the invention improves the training, learning, and practicing processes of dental treatment, through teaching synchronized hand-eye coordination that is imparted by the instructors to the dental hygiene and dental students (apprentices), in a faster and more effective way than the existing method (tabletop). Moreover, the invention offers a practicing mode which enables apprentices to practice dental tasks at the oral cavity orientations that the instructor taught in the teaching session.

Figure 1:
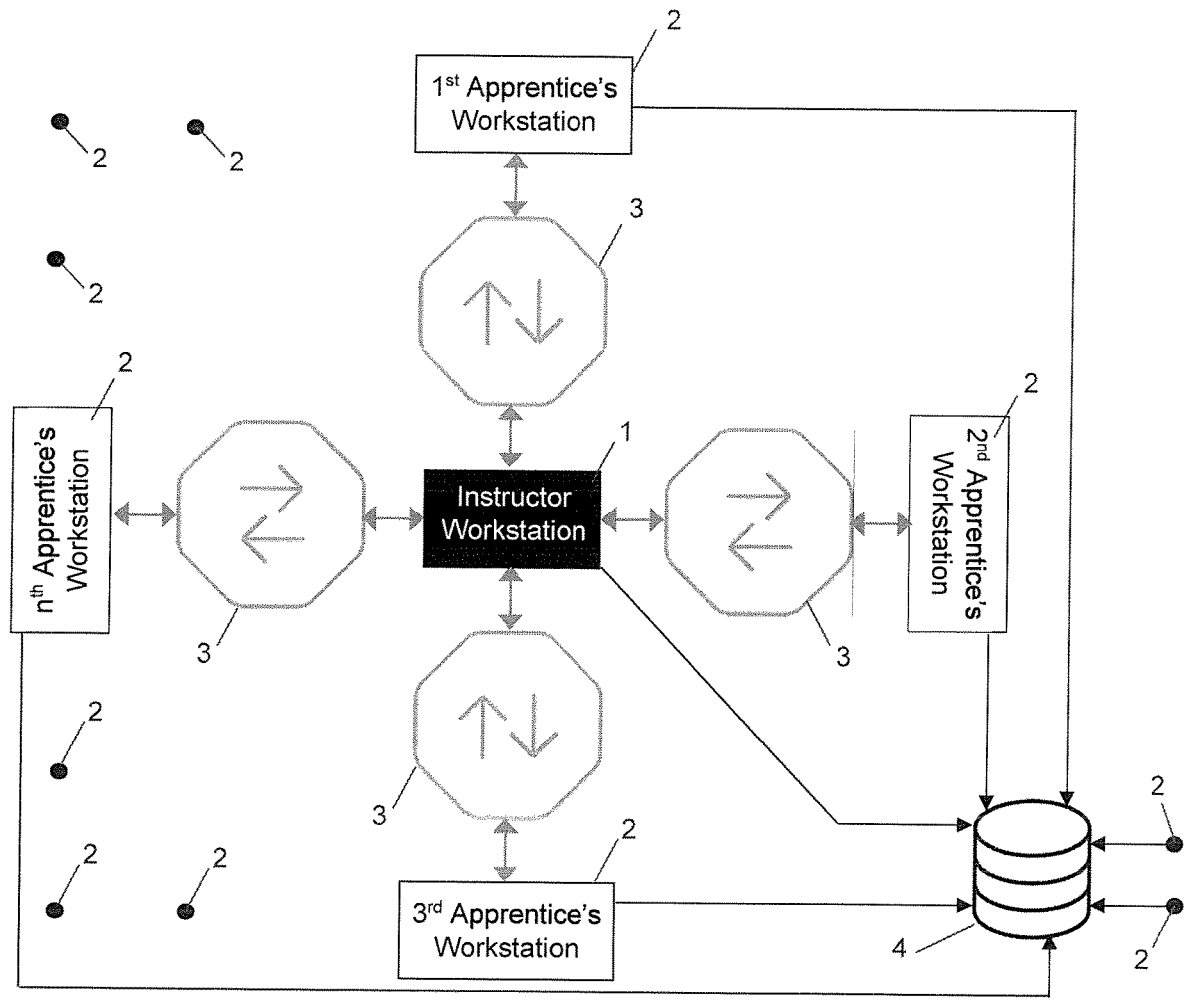
FIG. 1 shows the overall scheme of the apparatus that consists of the instructor's workstation, a number of apprentice's workstations, a data transmission system, and a data storage system along with the overall workflow of main components of the invention.

FIG. 1 presents the overall scheme of the apparatus. Said instructor's workstation 1 is the location where an instructor is situated to conduct different dental tasks. The instructor communicates with each said apprentice's workstation 2 through the data transmission system 3. Said data transmission system 3 can be a local network-based, a wired or wireless internet-based connection. During the performance of the dental tasks, data including data of sensory systems of the instructor and apprentice' workstations as well as audiovisual recordings taken from the instructor's workstation 1 are stored in said data storage system 4 for further purposes including for the use by apprentices to practice the lectures taught by the instructor in a later time. The data storage system 4 can be a hardware storage system located in the classroom or any cloud-based storage system. The data stored in the data storage system 4 include video and audio data of the task environment while a dental task is performed by the instructor, physical data measured by sensory systems of the instructor's workstation 1 and the apprentice' workstations 2 as well as the values of the actuators' displacements or velocities defined by the instructor before starting the teaching session to position the articulator an in a proper configuration.

Figure 2:
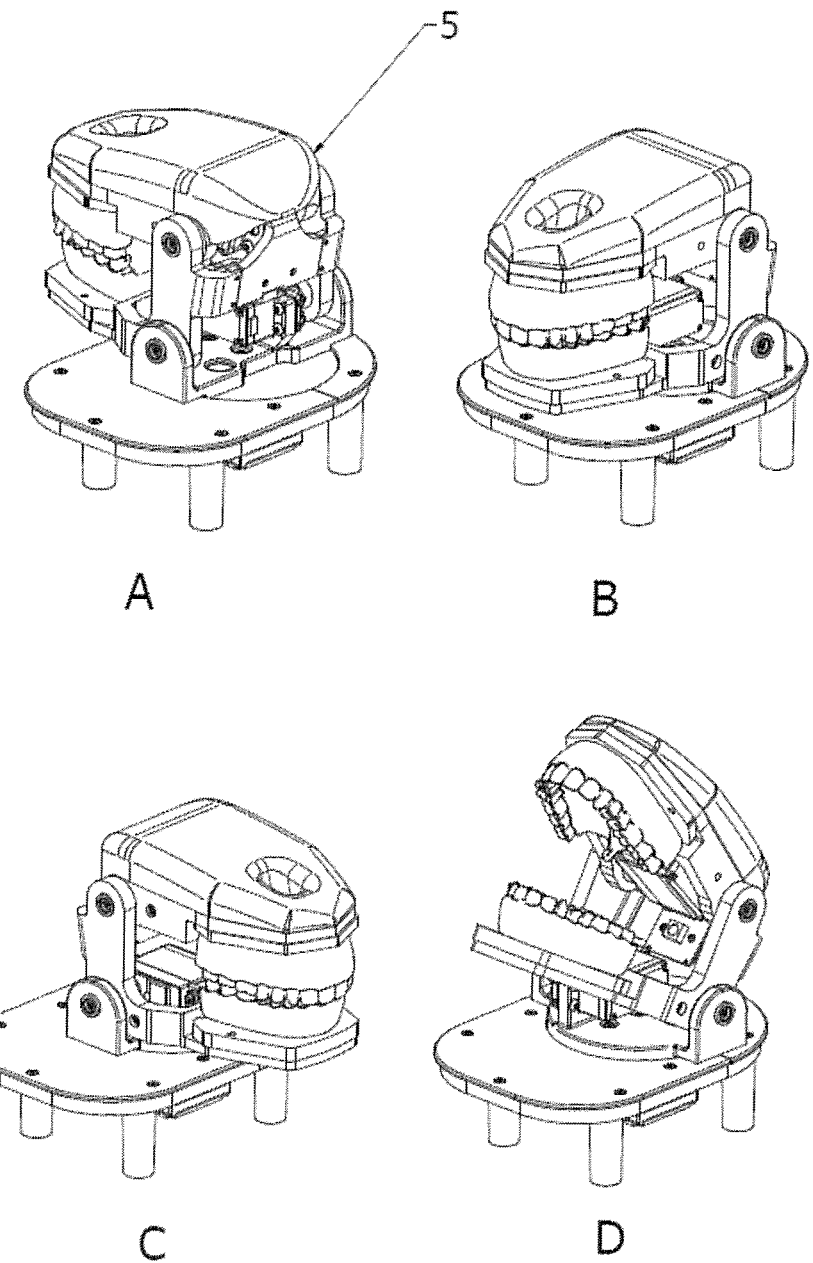
FIG. 2 shows example configurations of the dental articulator of the apparatus of FIG. 1 that is used for left-handed and right-handed users.

FIG. 2 shows example configurations of the automated dental articulator 5 that may be used for a left-handed instructor or apprentice (A) or a right-handed instructor or apprentice (C). The apparatus may be positioned in the home position (B) or in a configuration showing the patient's real posture in dentistry (D).

Figure 3:
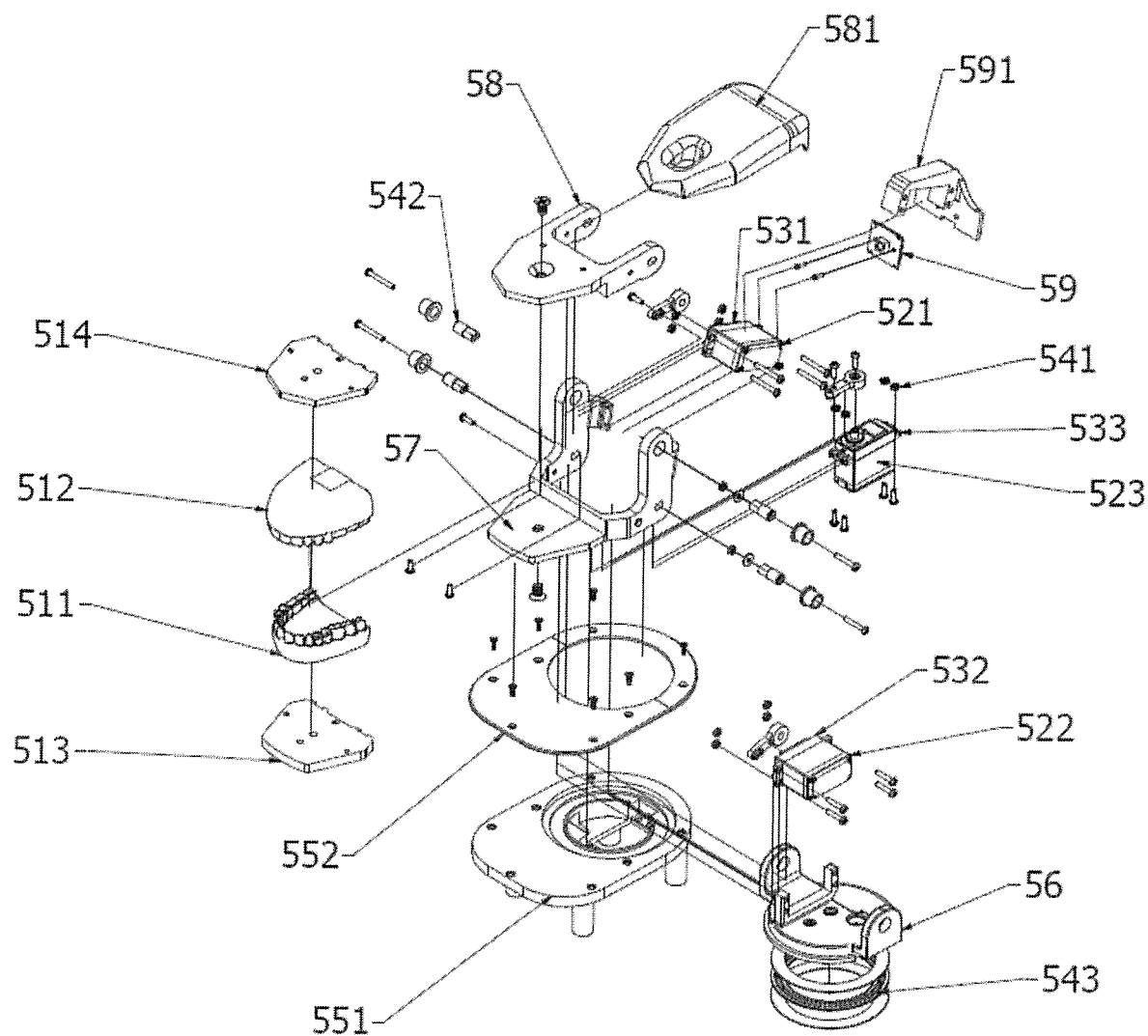
FIG. 3 illustrates the components of the automated dental articulator at the instructor's workstation or the apprentice's workstation, an automated dental articulator including teeth, gingiva, and a palate, a set of actuators, a set of sensory systems, bearings, shafts, linkages that connect the components together.

FIG. 3 shows the components of the automated dental articulator 5 at the instructor's workstation or the apprentice's workstation. The automated dental articulator 5 includes lower jaw 511 and its holder 513, upper jaw 512 and its holder 514, a set of actuators 521, 522, 523 to rotate around the vertical and horizontal axes, a set of sensory systems 531, 532, 533 embedded with the actuators 521, 522, 523, bearings 541, bushings 542, a base 551 and its top plate 552 on which the entire automated dental articulator 5 and its components are mounted, a lower linkage 56 that moves the automated dental articulator 5 and its components, a middle linkage 57 that moves the lower jaw 511 and its holder 513, an upper linkage 58 that moves the upper jaw 512 and its holder 514 and its cover 581, an inside camera 59 and its holder 591. The lower linkage 56 and its components are connected through a joint that includes bearing 543.

Figure 4:
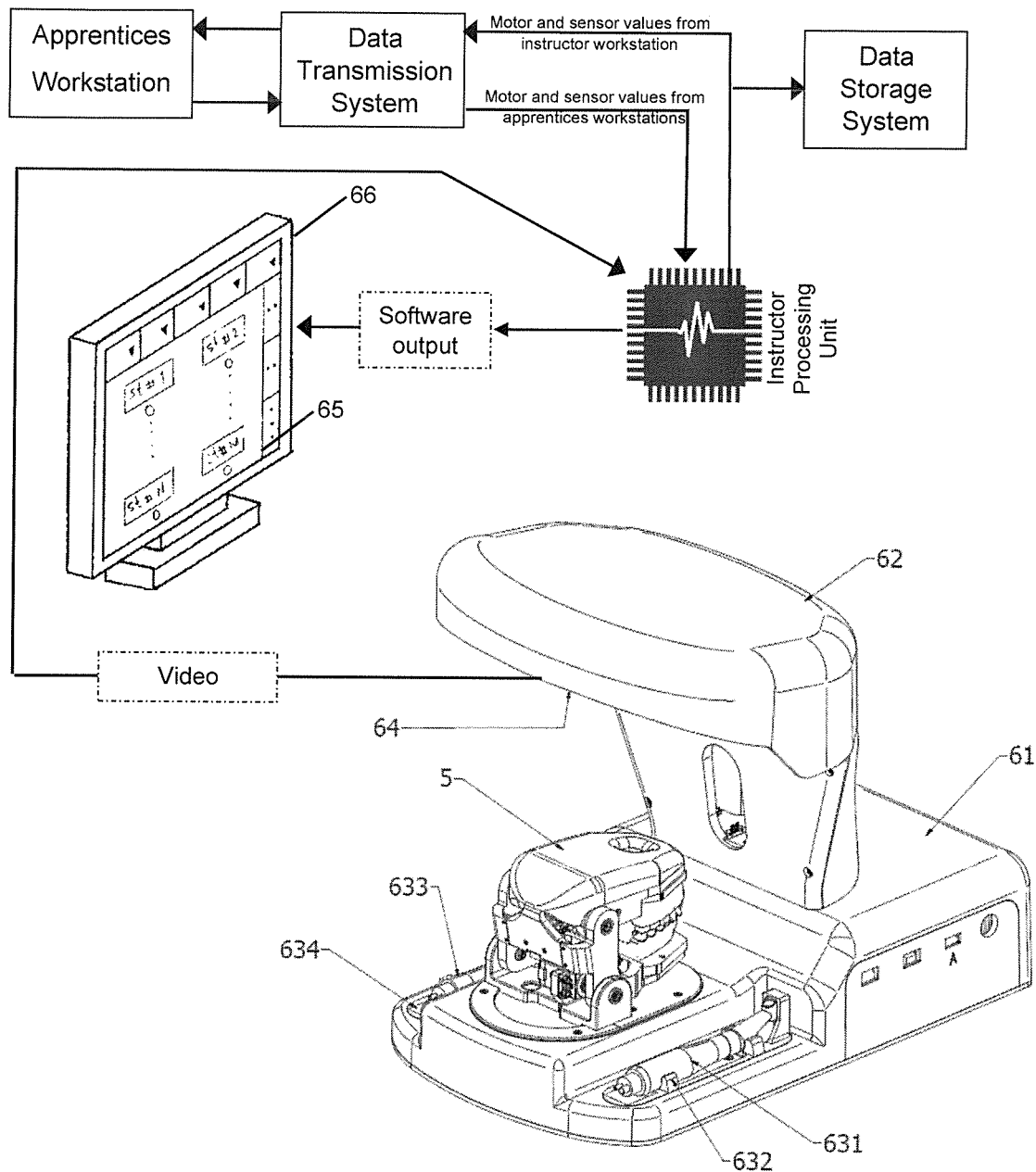
FIG. 4 shows the elements used in the instructor's workstation that include a processing unit, an automated dental articulator including teeth, gingiva, and a palate, a set of actuators, a set of sensory systems, bearings, shafts, linkages that connect the components together, an audiovisual recording system including multiple cameras, a software, a display, and a framework designed for initialization and registration of the setup.

FIG. 4 shows an overall view of the instructor's workstation that includes a case 61 to cover the electrical and mechanical components, an automated dental articulator 5, an audiovisual recording system 64 including multiple cameras, a software 65, a display 66, and a framework designed for initialization and registration of the setup that includes the slow-speed handpiece 631, its locator 632, high-speed handpiece 633 and its locator 634, and a hood 62 that holds the audiovisual recording system 64 and secures the electrical and mechanical components.

Figure 5:
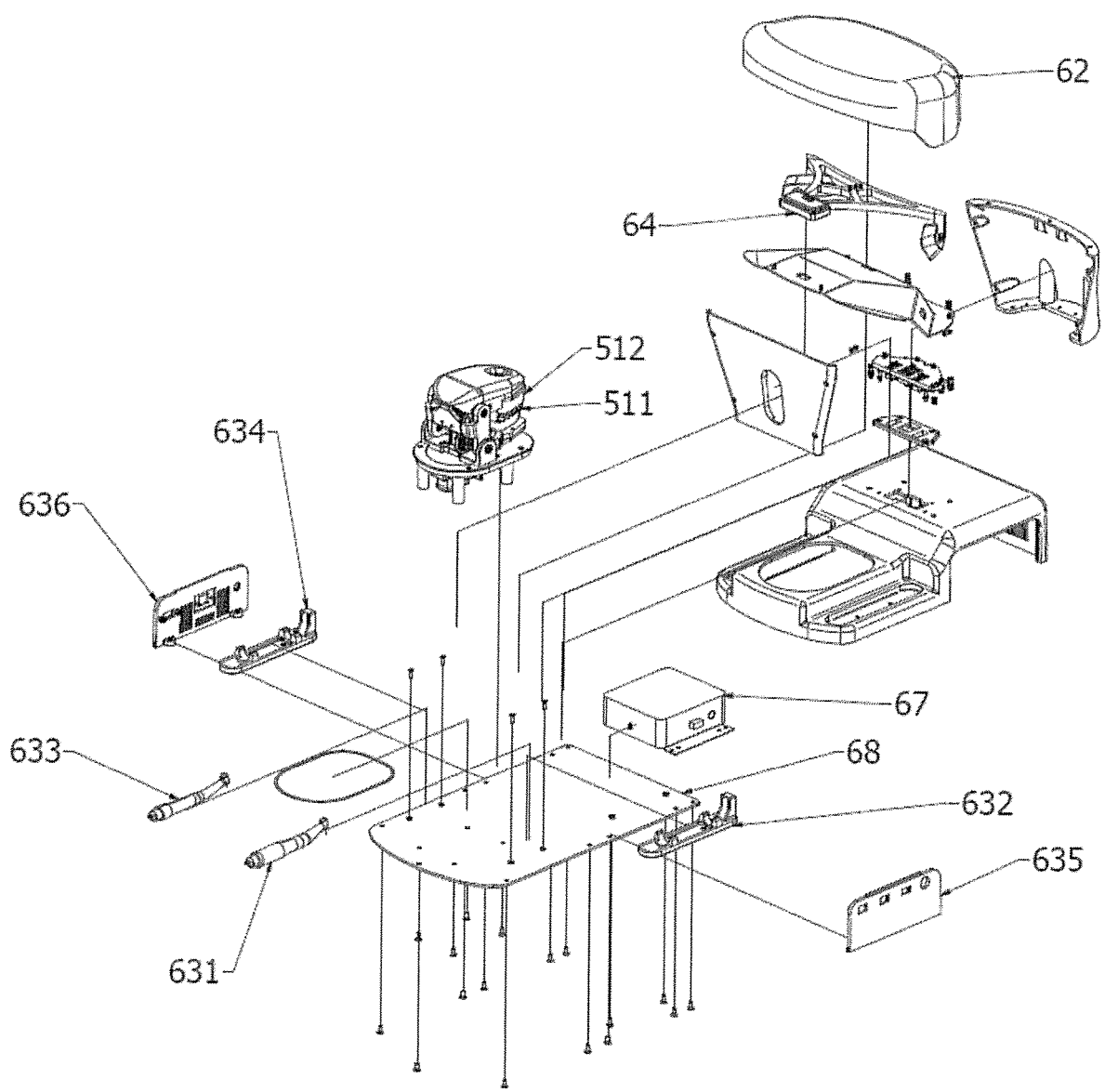
FIG. 5 illustrates a detailed view of the components of the automated dental articulator at the instructor's workstation, including a processing unit, an automated dental articulator including teeth, gingiva, and a palate, a set of actuators, a set of sensory systems, bearings, shafts, linkages that connect the components together, an audiovisual recording system including multiple cameras, a software, a display, and a framework designed for initialization and registration of the setup.

FIG. 5 shows details on the apparatus used in the instructor's workstation 1 along with its workflow. A dental task is conducted by said instructor using a dental tool 631 or 633 on a tooth physical model 511 or 512 attached to the automated dental articulator 5. The instructor's processing unit 67 includes the main processor responsible for: (i) receiving and analyzing data of a sensory system 531, 532, and 533 attached to corresponding actuators 521, 522, and 523 that are set at the beginning of the session, or during the performance of the dental task, by the instructor; (ii) recording video and audio that are taken from the audiovisual recording system that has multiple cameras 64 and the inside camera 59; (iii) communicating with the apprentices' workstations 2 and the data storage system 4 via the data transmission system 3; and (iv) providing the instructor with user-friendly software 65 designed for teaching different dental tasks which is screened on the display 66. Said software 65 enables the instructor to choose different options including the teaching session along with the time and date, the angles forming the posture of the automated articulator 5 as well as the type of the dental task. Sensory system 531, 532, and 533 are attached to the actuators 521, 522, and 523 respectively, to measure the angular or linear displacement or velocity of each joint. The instructor setup 1 is covered by the case 61 a bottom plate 68. Sensory system 531, 532, and 533 can be mounted onto different types of actuators including electrical, pneumatic, piezoelectric or hydraulic motors.

Figure 6:
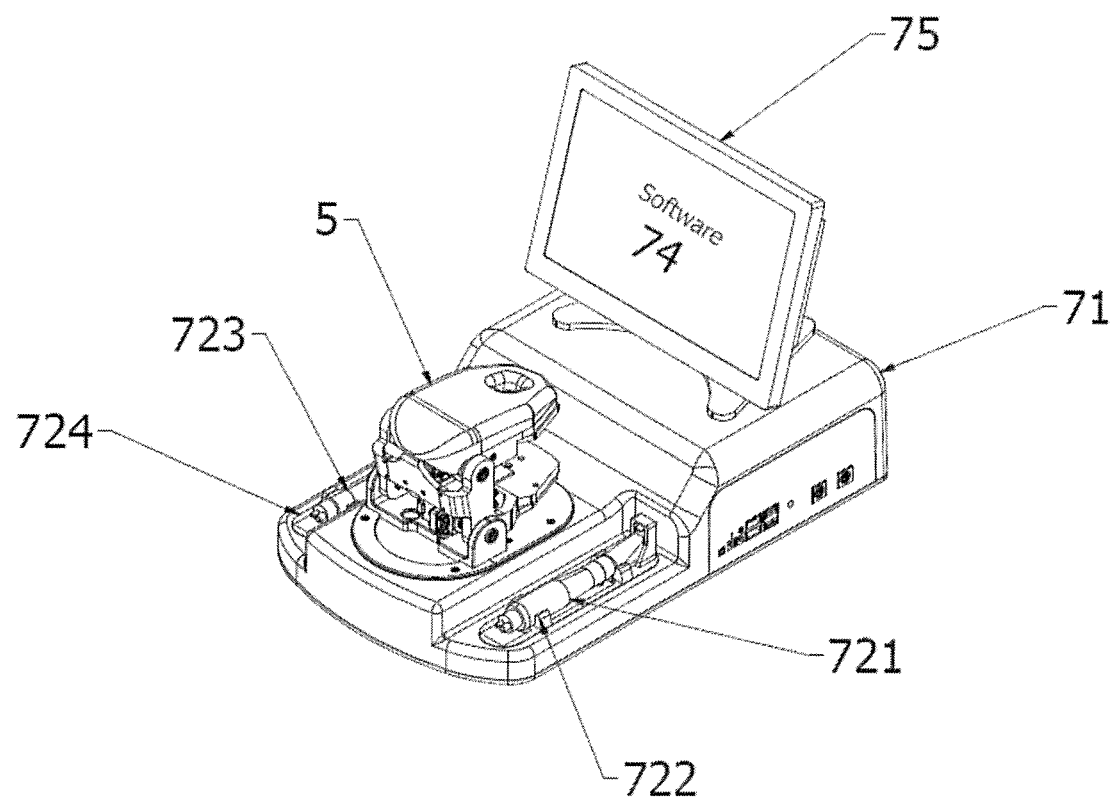
FIG. 6 shows the elements used in the apprentice's workstation that include a processing unit, an automated dental articulator including teeth, gingiva, and a palate, a set of actuators, a set of sensory systems, bearings, shafts, linkages that connect the components together, a software, a display, and a place to hold the dental handpieces.

FIG. 6 shows an overall view of each apprentice's workstation that includes a case 71 to cover the electrical and mechanical components, an automated dental articulator 5, an interactive system including a display 75, a software 74, and a framework designed for initialization and registration of the setup that includes the slow-speed handpiece 721, its locator 722, high-speed handpiece 723, and its locator 734.

Figure 7:
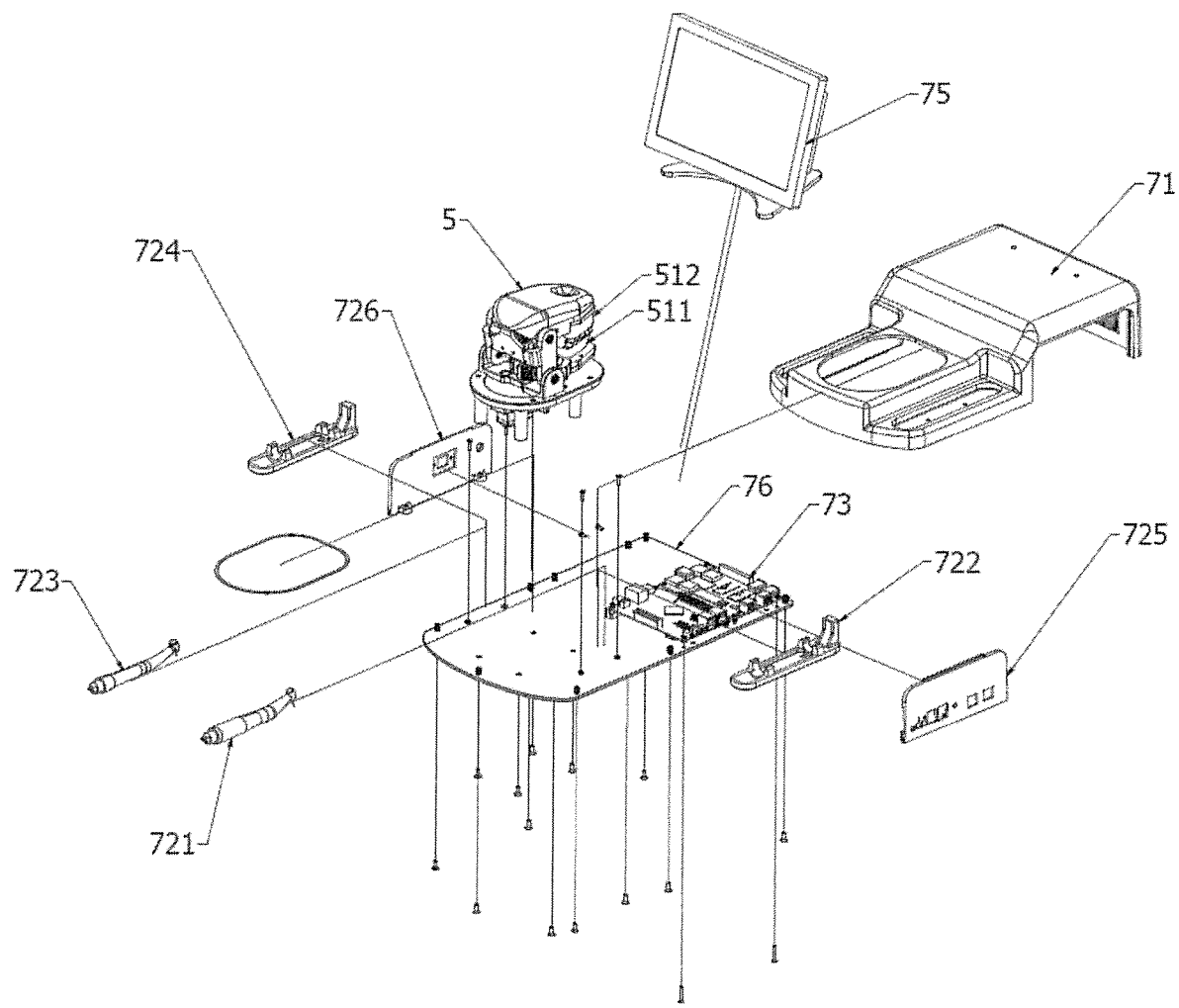
FIG. 7 shows a detailed view of the elements used in the apprentice's workstation that include a processing unit, an automated dental articulator including teeth, gingiva, and a palate, a set of actuators, a set of sensory systems, bearings, shafts, linkages that connect the components together, a software, a display, and a place to hold the dental handpieces.

FIG. 7 shows details on the apparatus used in the apprentice's workstation 2 along with its workflow. A dental task is conducted by said apprentice using a dental tool 721 or 723 on a tooth physical model 511 or 512 attached to the automated dental articulator 5. The apprentice's processing unit 73 includes the main processor responsible for: (i)

receiving and analyzing data of a sensory system 531, 532, and 533 attached to corresponding actuators 521, 522, and 523 that are transferred by the instructor's processing unit 67, or during the performance of the dental task, by the instructor; (ii) reading recorded video and audio that are taken from the audiovisual recording system 64 from the teaching session; (iii) communicating with the instructor' workstations 1 and the data storage system 4 via the data transmission system 3; and (iv) providing each apprentice with user-friendly software 74 designed for learning different dental tasks which is screened on the display 75. Said software 74 enables the student to choose different options including the classroom session along with the time and date, the angles forming the posture of the automated articulator 5 as well as the type of the dental task. Sensory system 531, 532, and 533 are attached to the actuators 521, 522, and 523 respectively, to measure the angular or linear displacement or velocity of each joint. The apprentice's setup 1 is covered by the case 71 a bottom plate 76. Sensory system 531, 532, and 533 can be mounted onto different types of actuators including electrical, pneumatic, piezoelectric or hydraulic motors.

Referring now more generally to FIGS. 1 through 7, some aspects of the invention will now be described in further detail. As described herein, the dental training system generally includes an instructor apparatus 1 referred to as the instructor's workstation for use by an instructor and a plurality of dental training apparatuses 2 referred to as the apprentices' workstations for use by individual trainees respectively. A suitable communication system or communications network 3 provides communication between the dental training apparatuses 2 and the instructor apparatus 1.

The instructor apparatus 1 generally includes a base plate 68 arranged to be supported on a horizontal supporting surface. A central processing unit 67 is supported on the base plate towards a rear end thereof. The processing unit 67 includes a processor and a memory storing program instructions thereon that are executable by the processor to perform the various functions of the instructor apparatus as described herein. A lower housing or case 61 mounts over top of the base plate 68 to enclose the central processing unit within the interior of the lower housing.

The dental articulator 5 is supported on the lower housing 61 adjacent a forward end thereof. The details of the dental articulator will be described in further detail below. An upper housing 62 is connected to a rear of the lower housing 61 to extend upwardly therefrom so that a portion of the upper housing 62 is situated over and above the dental articulator 5 while being sufficiently spaced above the articulator so as not to restrict access to an instructor performing a simulated dental procedure on the dental articulator 5 using dental tools.

The upper housing 62 supports a recording system 64 thereon which includes numerous video cameras, each arranged to capture a respective field-of-view comprised of a plurality of video images. The upper camera of the recording system has a field-of-view which captures the entirety of the dental articulator 5 therebelow as well as a peripheral environment adjacent to and surrounding the dental articulator 5 such that a dental tool held in the hand of an operator performing a simulated dental procedure on the dental articulator 5 is also captured within the field-of-view of the upper camera. The recording system 64 further records audio in synchronicity with the video images. Additional cameras can also form part of the recording system for capturing additional views of the dental articulator. For example, an internal camera 59 can be supported internally within the dental articulator to capture interior surfaces of the dental articulator within the field-of-view of the internal camera. All recorded data including the video images and the synchronous audio are stored on a suitable database associated with the recording system 64. The recorded information can be recalled on a computer display 66 associated with the instructor apparatus 1 or on corresponding displays of the dental training apparatuses 2 associated with the trainees as described in further detail below.

The lower housing 61 of the instructor apparatus further includes a first tool dock 632 and a second tool dock 634 laterally offset at opposing sides from the dental articulator 5 at a forward portion of the housing so that the tool docks 632 and 634 are diametrically opposed from one another with the dental articulator 5 received centrally therebetween. A first dental tool 631 and a second dental tool 633 can be docked on the tool receiving docks 632 and 634 respectively. Each of the tools is arranged to be used in performing a simulated dental procedure on the dental articulator 5 of the instructor apparatus.

An instructor software 65 is associated with the instructor apparatus. The instructor software may be included in a personal computer having its own internal processor and memory storing programming instructions thereon arranged to be executed by the processor for performing various additional functions associated with the dental training system in general and with the instructor apparatus in particular. A data storage system 4 is also associated with the computer device for storing all of the data collected from the recording system 64 and from various sensors associated with the dental articulator 5 as described below.

A computer input device is also associated with the processing unit 67 of the instructor apparatus directly so as to be arranged receive user input and various input commands from the instructor to initiate the various functions associated with the instructor apparatus.

The dental training apparatus 2, also known as the apprentice's workstation, also comprises its own base plate 76 at the bottom of the apparatus which is arranged to be supported on a horizontal supporting surface. A central processing unit 73 is supported on the base plate at the rear end thereof. Similarly to the instructor apparatus, the processing unit 73 of the includes a processor and a memory storing programming instructions thereon which are executable by the processor so as to perform the various functions of the training apparatuses described herein. A housing or case 71 is supported on the base plate 76 to enclose the central processing unit 73 within the interior of the housing.

A dental articulator 5 is again supported on the housing 71 at the front end of the apparatus in which the dental articulator 5 of the dental training apparatus 2 of each trainee is identical to the corresponding dental articulator of the instructor apparatus.

A display monitor 75 is supported on the housing 71 at the rear of the housing to face forwardly towards the dental articulator 5 at the forward end of the housing. The display 75 is operatively connected to the central processing unit 73 to display various data and/or captured images from the instructor apparatus via said software 74. The display monitor 75 may be a touch screen to also serve as an input device to receive operator commands and selections from the trainee. Additional ports are provided on the housing 71 in communication with the internal processing unit 73 for connection of one or more peripheral devices that may function as additional input devices to receive user commands and selections from the operator.

A first tool dock 722 and a second tool dock 724 are provided on the front of the housing 71 at laterally opposing sides of the dental articulator 5 similarly to the arrangement of the instructor apparatus. A first dental tool 721 and a second dental tool 723 are arranged to be docked within the first and second tool docks 722 and 724 respectively. The dental tools are used by the trainee to perform simulated dental procedures on the dental articulator 5.

In the dental training apparatus 2 for the trainee and the instructor apparatus 1 for the instructor, the dental articulators 5 are identical to one another. In each instance the dental articulator 5 is arranged to support a dental model therein comprising a lower jaw portion 511 and an upper jaw portion 512 forming a typodont. The dental model formed by the upper and lower jaw portion 511 and 512 fully simulate the mouth of a dental patient including upper teeth on the upper jaw portion, lower teeth on the lower jaw portion, gingiva surrounding the teeth on both jaw portions, and a palate simulating an oral cavity for example.

The dental articulator includes a lower frame member defined by a middle linkage 57 and an upper frame member defined by an upper linkage 58. The lower frame member includes a forward plate and a pair of legs extending upwardly and rearwardly from laterally opposing sides of the forward plate. A mounting plate 513 is releasably coupled to the lower jaw portion 511 of the dental model and serves to attach the lower jaw portion 511 releasably and interchangeably on the forward plate of the lower frame member 57. The upper frame member 58 also includes a forward plate and a pair of legs, however the legs extend generally rearwardly from opposing sides of the forward plate. A second mounting plate 514 is releasably coupled on the upper jaw portion of the dental model and serves to attach the upper jaw portion releasably onto the forward plate of the upper frame member 58.

A first hinge assembly pivotally couples the rear ends of the legs of the upper frame member 58 onto respective ones of the top ends of the legs of the lower frame member 57 using suitable bushings 542 which pivotally couple the upper frame member to the lower frame member for relative pivotal movement about a horizontal jaw axis of the first hinge assembly. A first actuator 521 is operatively connected between the upper frame member 58 and the lower frame member 57 to controllably pivot the upper frame member relative to the lower frame member about the jaw axis of the first hinge assembly. A first sensor 531 is associated with the first hinge assembly to measure angular position or angular movement of one or both of the upper and lower frame members about the jaw axis relative to a frame of reference or relative to one another. The data output by the first sensor can be used by the controller to determine or calculate a value corresponding to a measured angle of orientation of the upper frame member 58 relative to the lower frame member 57. The controller may operate to position the upper and lower frame members relative to one another at the first hinge assembly using the first actuator 521 until the frame members assume a prescribed orientation relative to one another as confirmed by the measured angle of orientation by the first sensor 531. The targeted prescribed orientation is set by the controller associated with the corresponding apparatus as described in further detail below.

The dental apparatus further includes a supporting assembly defined by a lower linkage 56 providing the function of a supporting frame member that is operatively connected to the lower frame member 57 of the dental articulator. The supporting frame member 56 comprises a circular plate supported below the lower frame member 57 and which includes upstanding pair of mounting legs at diametrically opposing sides of the bottom plate which are spaced apart from one another to correspond to the lateral distance between the legs of the lower frame member 57. A second hinge assembly is defined as a pivotal coupling between the mounting legs on the supporting frame member 56 and the legs of the lower frame member 57 respectively. The coupling the second hinge assembly is located on the legs of the lower frame member 57 at a location spaced below the coupling of the first hinge assembly. In this manner the lower frame member 57 (and the corresponding upper frame member 58 coupled thereto) are pivotal about a tilt axis of the second hinge assembly relative to the supporting frame member 56. The tilt axis is parallel to the jaw axis at a location spaced directly therebelow in a neutral or home position B shown in FIG. 2 corresponding to a patient facing forward in an upright orientation. When the articulator is pivoted into a working position D shown in FIG. 2, corresponding to a patient laying down and facing upwardly in a normal dental procedure orientation, the tilt axis is displaced downwardly and rearwardly relative to the jaw axis as compared to the home position B.

A second actuator 522 is associated with the second hinge assembly by being operatively connected between the supporting frame member 56 and the lower frame member 57 of the second hinge assembly. Operation of the actuator 522 controllably displaces the angular orientation of the lower frame member 57 relative to the supporting frame member 56 about the tilt axis. A second sensor 532 is associated with the second hinge assembly to measure angular position or angular movement of one or both of the lower frame member 57 and the supporting frame member 56 about the tilt axis relative to a frame of reference or relative to one another. The data output by the second sensor can be used by the controller to determine or calculate a value corresponding to a measured angle of orientation of the lower frame member 57 relative to the supporting frame member 56. The controller may operate to position the lower frame member 57 and the supporting frame member 56 relative to one another at the second hinge assembly using the second actuator 522 until the frame members assume a prescribed orientation relative to one another as confirmed by the measured angle of orientation by the second sensor 532. The targeted prescribed orientation is set by the controller associated with the corresponding apparatus as described in further detail below.

The dental articulator 5 further includes a base assembly comprised of a base frame member 551 that supports a top plate 552 thereon. The base frame member 551 is arranged to be supported in fixed relation to the corresponding base plate of the corresponding apparatus so that the top plate 552 is substantially flush with an upper surface of the corresponding lower housing of the apparatus surrounding the base assembly of the dental articulator. The base frame member 551 and the top plate 552 each include a central circular aperture formed therein which receives the circular bottom plate portion of the supporting frame member 56 therein. A suitable bearing assembly 543 rotatably supports the supporting frame member 56 within the opening in the base frame member 551 to define a third hinge assembly in which the supporting frame member 56 is pivotal relative to the base frame member 551 about a vertical axis of the third hinge assembly.

A third actuator 523 is associated with the third hinge assembly by being operatively connected between the base frame member 551 and the supporting frame member 56 of the third hinge assembly. Operation of the actuator 523 controllably displaces the angular orientation of the supporting frame member 56 relative to the base frame member 551 about the vertical axis. A third sensor 533 is associated with the third hinge assembly to measure angular position or angular movement of one or both of the supporting frame member 56 and the base frame member 551 about the operate axis relative to a frame of reference or relative to one another. The data output by the third sensor 533 can be used by the controller to determine or calculate a value corresponding to a measured angle of orientation of the supporting frame member 56 relative to the base frame member 551. The controller may operate to position the supporting frame member and the base frame member relative to one another at the third hinge assembly using the third actuator 523 until the frame members assume a prescribed orientation relative to one another as confirmed by the measured angle of the orientation by the third sensor 533. The targeted prescribed orientation is set by the controller associated with the corresponding apparatus as described in further detail below.

The processing unit of the apparatus associated with each dental articulator 5 functions as a controller to operate to the first, second and third actuators to match the prescribed angular orientation between the frame members of the first hinge assembly about the jaw axis, of the second hinge assembly about the tilt axis, and of the third hinge assembly about the upright access. The prescribed angle of orientation about each axis that is targeted by the controller can be input into the controller in various manners.

In a first mode of operation of the dental training apparatus 2 associated with the trainee is operated by simply receiving the targeted prescribed angular orientations of each of the hinge assemblies as input settings by the trainee through operator commands received through the input device associated with the trainee apparatus such that the trainee operates the dental training apparatus 2 as a stand-alone device according to the input settings. Similarly across all modes of operation, the controller of the dental training apparatus 2 will continue to actuate the actuators of each hinge assembly until the feedback signal from the associated sensors (such as measured position and/or movement data) indicates that the targeted prescribed orientation has been met, while the trainee performs a simulated dental procedure on the dental model supported on the dental articulator 5 of the dental training apparatus 2 using one or both dental tools 721 and 723 of the dental training apparatus 2.

In a second mode of operation, the dental training apparatus 2 is operated together with the instructor apparatus 1 as part of the overall dental training system. In this instance, an instructor performs a simulated dental procedure on the dental model supported on the dental articulator 5 of the instructor apparatus 1 using one or both dental tools 631 and 633 of the instructor apparatus 1. While the instructor performs the simulated dental procedure using the instructor apparatus 1, the recording system 64 and/or said inside camera 59 are operated to record various video streams from the various cameras respectively. For example, the upper camera supported on the upper housing 62 has a field-of-view which captures the entirety of the exterior of the dental articulator as well as a sufficient peripheral area to capture a hand of the operator and one of the dental tools 631 or 633 in the hand of the operator. Furthermore, the inside camera 59 can be supported within the interior of the dental articulator to have a field-of-view which captures the interior surfaces of the teeth of both upper and lower drop portions of the dental model supported on the dental articulator 5. The recorded video images and accompanying synchronous audio are collectively stored together with measurement data from the sensors 531, 532, and 533 of the instructor apparatus 1 so that the prescribed angle associated with each of the first hinge assembly, the second hinge assembly and the third hinge assembly of the instructor apparatus are also determined and known.

In the second mode of operation, the trainee performs an identical dental procedure on the dental training apparatus 2 of the trainee at the same time as the instructor. Meanwhile the display of the training apparatus 2 displays the captured video images in real time. The controller of the training apparatus 2 also operates the actuators 521, 522 and 523 of the training apparatus 2 so that the frame members of the first, second and third hinge assemblies of the dental articulator 5 of the training apparatus 2 assume the same orientations as the instructor apparatus 1 by using the measured values from the instructor apparatus as an input to define the prescribed orientations that are targeted by the controller on the training apparatus 2.

When multiple streams of video images from multiple cameras are available, the controller of the training apparatus may be further configured to receive a video selection from the trainee as an operator command through the input device associated with the training apparatus to display monitor 75 of the training apparatus 2. The trainee can thus select which views are presented during a real-time training session using software 74.

In a third mode of operation, the instructor apparatus is operated identically to the second mode of operation, whereby the operator performs a dental procedure on the instructor apparatus and selects a desired angular orientation for each of the first, second and third hinge assemblies. This selection by the operator of the angular orientations on the instructor apparatus can be performed with the operator manually repositioning the dental articulator, or by the instructor providing suitable commands input through the input devices of the instructor apparatus to dictate how the actuators of the instructor apparatus position the dental articulator of the instructor apparatus. The third mode of operation differs from the second mode in that the video images and measured data relating to the angular orientations are not transmitted in real time to one or more training apparatuses 2, but rather all of this data is stored together in association with one another as a single instructional event on the data storage system associated with the instructor apparatus or with the dental training system as a whole. At a later time or date subsequent to completion of the simulated dental procedure by the instructor, a trainee initiates performing the same simulated dental procedure on a respective one of the training apparatuses 2 by initially activating the training apparatus 2 to recall the recorded data from the data storage system associated with a single instructional event, including video streams of video images captured by the recording system 64 as well as the measured data relating to angular orientations of the first hinge assembly, the second hinge assembly, and the third hinge assembly of the instructor apparatus 1. Once the trainee initiates playback of the selected instructional event of a simulated dental procedure, the selected streams of video are displayed on the video display of the training apparatus, and the controller of the training apparatus actuates the corresponding actuators 521, 522 and 523 of the training apparatus according to the recorded values so that the hinge assemblies will be positioned within the prescribed angular orientations recorded by the instructor apparatus, as confirmed by the feedback signals from the sensors 531, 532 and 533 of the training apparatus.

As described herein, an automated dental articulator is provided in at least one apprentice's workstation for use with another automated dental articulator at the instructor's workstation comprising: (A) an instructor's workstation for use by an instructor comprising (i) a custom-designed dental articulator having a pair of jaws, teeth, gingiva, and a palate representative of the human oral cavity; (ii) an actuation system embedded into the custom-designed dental articulator so as to generate necessary inputs to drive the main links of the custom-designed dental articulator; (iii) a sensory system attached to each actuator of the custom-designed dental articulator so as to sense at least one of the angular displacement, linear displacement, angular velocity, and linear velocity components of at least one of the actuators of the custom-designed dental articulator; (iv) a controller to ensure that the custom-designed dental articulator stops and remains at a particular posture; (v) a processing unit arranged to operate and control the actuation system of the custom-designed dental articulator according to at least one angle set that is defined by the instructor in the software at the instructor's workstation; (vi) a video streaming system that provides the apprentices with audiovisual feedback at different angles including the angles at which the instructor views the oral cavity and an angle from the inside of the oral cavity; (vii) a software arranged to be used as an interface program; (B) at least one apprentice's workstation for use by an apprentice comprising (i) a custom-designed dental articulator having a pair of jaws, teeth, gingiva, and a palate representative of the human oral cavity; (ii) an actuation system embedded in the custom-designed dental articulator so as to generate necessary inputs to drive the main links of the custom-designed dental articulator; (iii) a sensory system attached to each actuator of the custom-designed dental articulator so as to sense at least one of the angular displacement, angular velocity, linear displacement, and linear velocity components of at least one of the actuators of the custom-designed dental articulator; (iv) a processing unit arranged to operate and control the actuation system of the custom-designed dental articulator according to at least one angle or position set by the instructor in the software at the instructor's workstation; (v) a software arranged to be used as an interface program; (C) and at least one apprentice's workstation comprising (i) a set of sensory systems mounted onto a custom-designed dental articulator to measure angular and linear displacement and velocity component of said actuators at the apprentice's workstation while a dental task is conducted by an instructor in a classroom, clinic, or laboratory at the instructor's workstation or by an apprentice in a classroom, clinic, or laboratory, or a remote location at the instructor's workstation; (ii) a set of actuators that are controlled to place the custom-designed dental articulator at a particular posture; (iii) a controller to ensure that the custom-designed dental articulator stops and remains at a particular posture; (iv) a processing unit, comprising the main processor and software comprising a graphical user interface for interacting with the instructor; for analyzing data of said sensory system and audiovisual data; and for displaying data of each apprentice graphically.

The custom-designed dental articulator of at least one said apprentice's workstation preferably has a mechanical structure that is substantially identical in shape and size to a mechanical structure of the custom-designed dental articulator at said instructor's workstation, and wherein the actuation system and the sensory system are supported within the body of the custom-designed dental articulator.

When at least one said custom-designed dental articulator at the apprentice's workstation further comprises a sensory system arranged to sense at least one angular displacement, linear displacement, angular velocity, and linear velocity components of at least one of said actuators, the processing unit may be arranged to compare at least one said angular displacement, linear displacement, angular velocity, or linear velocity of the custom-designed dental articulator at the apprentice's workstation to at least one said angular displacement, linear displacement, angular velocity, or linear velocity of the custom-designed dental articulator at the instructor's workstation to provide real-time feedback to keep the custom-designed dental articulator at the desired orientation. The sensory system of at least one said apprentice's workstation is preferably supported internally within a housing of the custom-designed dental articulator.

The processing unit of at least one said apprentice's workstation is preferably arranged to operate the actuation system by comparing at least one angular displacement, linear displacement, angular velocity, or linear velocity sensed by the sensory system of the custom-designed dental articulator at the apprentice's workstation to at least one angular displacement, linear displacement, angular velocity, or linear velocity sensed by the sensory system of the custom-designed dental articulator at the instructor's workstation along one, two, or three axes.

The processing unit of at least one said apprentice's workstation may be arranged to automatically generate an alert if at least one angular displacement, linear displacement, angular velocity, or linear velocity sensed by the sensory system of the custom-designed dental articulator at the apprentice's workstation deviates from at least one angular displacement, linear displacement, angular velocity, or linear velocity sensed by the sensory system of the custom-designed dental articulator at the instructor's workstation.

The characteristics sensed by the sensory system of at least one said apprentice's workstation preferably include angular and linear displacements and velocity components of said actuators of the custom-designed dental articulator at the apprentice's workstation along one, two, or three axes.

At least one said apprentice's workstation may include a base station having a custom-designed dental articulator locator arranged to register an initial position and orientation of the custom-designed dental articulator at the apprentice's workstation relative to the base station.

The instructor's workstation may include a base station having a custom-designed dental articulator locator arranged to register an initial position and orientation of the custom-designed dental articulator at the instructor's workstation relative to the base station.

The training system in some instances includes a single apprentice's workstation, yet in other instances includes a plurality of apprentice's workstations.

The training system may be used in combination with the instructor's workstation and a data transmission system in communication between the instructor's workstation and at least one said apprentice's workstation so as to be arranged to communicate at least one sensed angular or linear displacement or velocity component of the custom-designed dental articulator at the instructor's workstation with the processing unit of at least one said apprentice's workstation.

The apprentice's workstation preferably further comprises a sensory system arranged to at least one angular and linear displacement and velocity component of the custom-designed dental articulator at the apprentice's workstation, in which the processing unit is arranged to compare at least one said angular and linear displacement and velocity component of the custom-designed dental articulator at the apprentice's workstation to at least one said angular and linear displacement and velocity component of the custom-designed dental articulator at the instructor's workstation in real-time during the performance of a dental procedure.

When the instructor's workstation further comprises a video streaming system arranged to capture video images of the custom-designed dental articulator and dental tools during the performance of said dental procedure, at least one said apprentice's workstation preferably comprises a display arranged to show the video images of the custom-designed dental articulator, the instructor's hand (tool handling), oral cavity including tooth, and the dental tools held by the instructor at the instructor's workstation during the performance of said dental procedure.

When the training system includes a recording system arranged to store the video images captured by the video streaming system along with at least one sensed angular and linear displacement and velocity components of the custom-designed dental articulator at the instructor's workstation during the performance of the dental procedure and replay the stored video images, the processing unit is preferably arranged to compare at least one said angular and linear displacement and velocity component of the actuators at the custom-designed dental articulator at the apprentice's workstation to at least one said angular and linear displacement or velocity component of the custom-designed dental articulator at the instructor's workstation while replaying the stored video images.

The sensory system of the instructor's workstation and the sensory system of at least one said apprentice's workstation may comprise accelerometers arranged to measure accelerations and jerks.

The sensory system of the instructor's workstation and the sensory system of at least one said apprentice's workstation may comprise gyros arranged to measure angular velocities.

The sensory system of the instructor's workstation and the sensory system of at least one said apprentice's workstation may comprise linear or rotary encoders arranged to measure angular displacements.

The sensory system of the instructor's workstation and the sensory system of at least one said apprentice's workstation may comprise inertial sensors including gyros, accelerometers, encoders and/or magnetometers to measure orientations.

The sensory system of the instructor's workstation and the sensory system of at least one said apprentice's workstation may comprise inertial sensors including gyros, encoders, and accelerometers and any combination of inertial sensors with ultrawideband systems, or cameras to measure positions.

The sensory system of the instructor's workstation and the sensory system of at least one said apprentice's workstation may comprise a combination of accelerometers, magnetometers, gyros, encoders, ultrawideband systems, and cameras.

The sensory system of the instructor's workstation and the sensory system of at least one said apprentice's workstation may be arranged to measure the position, orientation, velocities, accelerations, and jerk components along three Cartesian axes that are orthogonal to each other.

The sensory system of the instructor's workstation and the sensory system of at least one said apprentice's workstation may be arranged to measure the position, orientation, velocities, accelerations, and jerk components along any one of polar, cylindrical, spherical, homogeneous, or curvilinear coordinate systems.

The actuation system may comprise a combination of electromagnetic, hydraulic, pneumatic, pize-electric, muscle wire, piezo-ultrasonic, ultrasonic, tactile, electrostatic, electro-rheological fluid-based, or polymer-based actuator, or a manual actuation system.

The training system described above, may be used without the instructor apparatus to locate said actuators of at least one said apprentice's workstation at a particular configuration to allow the apprentice experiencing different posture of patients, while the apprentice is holding a dental tool to perform the dental procedure while the apprentice's custom-designed dental articulator mimics the posture of a custom-designed dental articulator that was used by the instructor previously in the teaching session.

The training system as described above may be used without the instructor apparatus to locate said actuators of at least one said apprentice's workstation at a particular configuration to allow the apprentice experiencing different posture of patients, while the apprentice is holding a dental tool to perform the dental procedure while the apprentice's custom-designed dental articulator has a posture that is directly set by the apprentice.

The system preferably also includes (i) a data transmission system to communicate between said instructor's workstation and said apprentice' workstations in a multilateral fashion; (ii) a data storage system to store data measured and analyzed at the instructor and students' workstations, and (iii) a video streaming system that includes several cameras to provide a spatial view to at least one said apprentice.

The invention may further relate to a method of use of the training system wherein the dental procedure includes examination, endodontics, prosthodontics, operative work, restorative work, surgery, extraction, or periodontics work. The procedure may include any one, or all, of piercing, cutting, forming hard, and soft tissues.

The training system described herein may also be used with an instructor's workstation comprising a setup having a set of actuators to drive the mechanical components of the invention, a sensory system arranged to sense at least one of the actuator's angular and linear displacements or velocities, a video streaming system, and a pair of lower and upper jaws with teeth used to emulate realistic orientation of the oral cavity while performing a dental procedure.

The invention also provides a dental practicing system for use without an instructor's workstation for practicing purposes comprising a set of sensory systems mounted onto a custom-designed dental articulator to measure angular and linear displacement and velocity component of said actuators while a dental task is conducted by a student in a classroom, clinic, or laboratory, or outside school;

a set of actuators that are controlled to place the custom-designed dental articulator at a particular posture;

a controller to ensure that the custom-designed dental articulator stops and remains at a particular posture;

a processing unit, comprising (i) a main processor and (ii) software including a graphical user interface; for analyzing data of said sensory system and audiovisual data; and for displaying data of each student graphically and statistically.

The custom-designed dental articulator preferably has a mechanical structure that is substantially identical in shape and size to the mechanical structure of the custom-designed dental articulator, and wherein the actuation system is supported internally within the body of the custom-designed dental articulator.

The actuation system may comprise a combination of electromagnetic, hydraulic, pneumatic, piezo-electric, muscle wire, piezo-ultrasonic, ultrasonic, tactile, electrostatic, electro-rheological fluid-based, or polymer-based actuator, or a manual actuation system.

The system may also be provided as a kit comprising the custom-designed dental articulator according to any aspect of the present invention noted above and a sheet of instructions for use thereof.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A dental training apparatus for supporting a dental model having a lower jaw portion supporting lower teeth thereon and an upper jaw portion supporting upper teeth thereon, the apparatus comprising:
   a dental articulator comprising (i) a lower frame member arranged to support the lower jaw portion of the dental model thereon, (ii) an upper frame member arranged to support the upper jaw portion of the dental model thereon, and (iii) a first hinge assembly coupling the lower frame member to the upper frame member so as to be pivotal relative to one another about a jaw axis of the first hinge assembly;
   a supporting assembly supporting the dental articulator thereon comprising (i) a supporting frame member, and (ii) a second hinge assembly coupling the supporting frame member to a primary frame member among the lower frame member and the upper frame member such that said primary frame member is pivotal relative to the supporting frame member about a tilt axis of the second hinge assembly;
   at least one of the hinge assemblies comprising a controlled hinge assembly including an actuator operatively connected between the frame members of the controlled hinge assembly; and
   a controller operatively connected to the actuator of the controlled hinge assembly so as to be arranged to controllably pivot the frame members relative to one another such that the frame members of the controlled hinge assembly assume a prescribed angular orientation of the controlled hinge assembly relative to one another.

2. The dental training apparatus according to claim 1 wherein said at least one of the hinge assemblies includes the first hinge assembly such that the controller is arranged to actuate the actuator of the first hinge assembly to pivot the upper and lower frame members relative to another about the jaw axis to assume the prescribed angular orientation of the first hinge assembly.

3. The dental training apparatus according to claim 1 wherein said at least one of the hinge assemblies includes the second hinge assembly such that the controller is arranged to actuate the actuator of the second hinge assembly to pivot the primary frame member relative to the supporting frame member about the tilt axis to assume the prescribed angular orientation of the second hinge assembly.

4. The dental training apparatus according to claim 1 further comprising:
   a base assembly comprising (i) a base frame member, and (ii) a third hinge assembly coupling the supporting frame member to the base frame member such that the supporting frame member is pivotal relative of the base frame member about an upright axis of the third hinge assembly;
   wherein the tilt axis is parallel and spaced apart from the jaw axis.

5. The dental training apparatus according to claim 4 wherein said at least one of the hinge assemblies includes the third hinge assembly such that the controller is arranged to actuate the actuator of the third hinge assembly to pivot the supporting frame member relative to the base frame member about the upright axis to assume the prescribed angular orientation of the third hinge assembly.

6. The dental training apparatus according to claim 5 wherein each of the first hinge assembly, the second hinge assembly and the third hinge assembly all comprise controlled hinge assemblies such that the controller is arranged to:
   (i) actuate the actuator of the first hinge assembly to pivot the upper and lower frame members relative to another about the jaw axis to assume the prescribed angular orientation of the first hinge assembly;
   (ii) actuate the actuator of the second hinge assembly to pivot the primary frame member relative to the supporting frame member about the tilt axis to assume the prescribed angular orientation of the second hinge assembly; and
   (iii) actuate the actuator of the third hinge assembly to pivot the supporting frame member relative to the base frame member about the upright axis to assume the prescribed angular orientation of the third hinge assembly.

7. The dental training apparatus according to claim 1 further comprising an input device arranged to receive user input, the controller being arranged to variably adjust the prescribed angular orientation stored thereon in response to the user input received by the input device.

8. The dental apparatus according to claim 1 wherein the controlled hinge assembly further comprises a feedback sensor operatively connected to one or both frame members of the controlled hinge assembly so as to be arranged to provide a feedback signal relating to a position and/or a movement of the controlled hinge assembly to the controller, the controller being arranged to use the feedback signal from the feedback sensor in controlling the actuator to controllably pivot the frame members relative to one another such that the frame members of the controlled hinge assembly assume the prescribed angular orientation.

9. The dental training apparatus according to claim 1 in combination with an instructor apparatus for supporting an instructor model thereon, the instructor model having a lower jaw portion supporting lower teeth thereon and an upper jaw portion supporting upper teeth thereon, the instructor apparatus comprising:
   an instructor dental articulator comprising (i) a lower frame member arranged to support the lower jaw portion of the instructor model thereon, (ii) an upper frame member arranged to support the upper jaw portion of the instructor model thereon, and (iii) a first hinge assembly coupling the lower frame member to the upper frame member so as to be pivotal relative to one another about a jaw axis of the first hinge assembly;
   an instructor supporting assembly supporting the instructor dental articulator thereon comprising (i) a supporting frame member, and (ii) a second hinge assembly coupling the supporting frame member to a primary frame member among the lower frame member and the upper frame member such that said primary frame member is pivotal relative to the supporting frame member about a tilt axis of the second hinge assembly;
   a sensor assembly arranged to measure a measured angle between the frame members of at least one of the hinge assemblies of the instructor apparatus;

the controller of the dental training apparatus being arranged to acquire the measured angle of said at least one of the hinge assemblies of the instructor apparatus from the sensor assembly and define the prescribed angular orientation of a corresponding one of the hinge assemblies of the dental training apparatus based upon the acquired measured angle from the instructor apparatus.

10. The dental training apparatus according to claim 9 wherein the controller of the dental training apparatus is arranged to acquire the measured angle and define the prescribed angular orientation of the dental training apparatus based upon the acquired measured angle from the instructor apparatus in real time.

11. The dental training apparatus according to claim 9 further comprising a memory arranged to store the measured angle from the instructor apparatus, the controller of the dental training apparatus being arranged to acquire the measured angle from the memory and define the prescribed angular orientation of the dental training apparatus based upon the acquired measured angle from the instructor apparatus subsequent to operation of the instructor apparatus.

12. The dental training apparatus according to claim 9 in combination with one or more apprentice training apparatuses that are identical in configuration to said dental training apparatus, each of the dental training apparatus and the one or more apprentice training apparatuses being arranged to acquire the measured angle of said at least one of the hinge assemblies of the instructor apparatus from the sensor assembly and define the prescribed angular orientation of a corresponding one of the hinge assemblies of the dental training apparatus based upon the acquired measured angle from the instructor apparatus.

13. The dental apparatus according to claim 9 further comprising a video camera arranged to capture video images of the instructor dental articulator and a video display supported adjacent to the dental articulator of the dental training apparatus, the video display being arranged to display the captured video images from the instructor apparatus.

14. The dental apparatus according to claim 13 further comprising a recording system arranged to record the captured video images of the instructor dental articulator and record the measured angle from the instructor apparatus in association with the captured video images, the controller of the dental training apparatus being arranged to subsequently acquire the measured angle and the captured video images from the recording system so as to be arranged to display the captured video images on the video display in synchronicity with operating the actuator of the controlled hinge assembly at the prescribed angular orientation based upon the acquired measured angle.

15. The dental apparatus according to claim 13 further comprising a plurality of video cameras arranged to capture video images from different fields of view of the instructor dental apparatus, the video display of the dental training apparatus being arranged to display the capture video images from each of the video cameras.

16. The dental apparatus according to claim 15 further comprising an input device in communication with the controller and arranged to receive user input, the controller being arranged to display captured video images only from one or more selected ones of the different fields of view in response to user input received from a user through the input device.

17. The dental apparatus according to claim 15 wherein one of the video cameras is supported internally within the instructor dental articulator so as to be arranged to capture video images of interior surfaces of the instructor model supported on the instructor dental articulator.

18. The dental apparatus according to claim 13 wherein a field of view of the video camera includes a peripheral area surrounding the instructor dental articulator such that the video camera is arranged to capture the video images such that the video images include a hand and a dental tool within the hand of an operator performing a dental procedure on the instructor model.

19. A method of use of the dental apparatus according to claim 1, the method including:
while a trainee performs a dental procedure on the dental model on the dental training apparatus, using the controller to operate the actuator of the controlled hinge assembly of the dental training apparatus so as to be arranged to controllably pivot the frame members of the controlled hinge assembly relative to one another such that the frame members of the controlled hinge assembly assume said prescribed angular orientation of the controlled hinge assembly relative to one another.

20. A method of use of the dental apparatus according to claim 9, the method including:
measuring said measured angle on the instructor apparatus while an instructor performs a dental procedure on the instructor model supported on the instructor apparatus; and
while a trainee performs said dental procedure on the dental model on the dental training apparatus, using the controller to operate the actuator of the controlled hinge assembly of the dental training apparatus so as to be arranged to controllably pivot the frame members of the controlled hinge assembly relative to one another such that the frame members of the controlled hinge assembly assume said measured angle as the prescribed angular orientation of the controlled hinge assembly relative to one another.

\* \* \* \* \*